(12) United States Patent
Nakamura (10) Patent No.: US 12,081,026 B2
(45) Date of Patent: Sep. 3, 2024

(54) MANAGEMENT APPARATUS, ELECTRICAL POWER SYSTEM, AND METHOD OF SUPPLYING ELECTRICAL POWER

(71) Applicant: KYOCERA CORPORATION, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 281 days.

(21) Appl. No.: 17/480,093

(22) Filed: Sep. 20, 2021

(65) Prior Publication Data

US 2022/0006293 A1 Jan. 6, 2022

Related U.S. Application Data

(63) Continuation of application No. PCT/JP2020/011859, filed on Mar. 17, 2020.

(30) Foreign Application Priority Data

Mar. 25, 2019 (JP) ................................. 2019-057359

(51) Int. Cl.
*H02J 3/32* (2006.01)
*H02J 3/38* (2006.01)
*H02J 13/00* (2006.01)

(52) U.S. Cl.
CPC .................. *H02J 3/32* (2013.01); *H02J 3/38* (2013.01); *H02J 13/00002* (2020.01)

(58) Field of Classification Search
CPC ........... H02J 3/38; H02J 3/32; H02J 13/00002
(Continued)

(56) References Cited

U.S. PATENT DOCUMENTS 10,600,134 B2 3/2020 Miyamoto et al.
10,811,880 B2 * 10/2020 Kim .......................... H02J 7/35
(Continued)

FOREIGN PATENT DOCUMENTS

| EP | 2475068 A1 | 7/2012 |
| EP | 2506205 A1 | 10/2012 |
| WO | 2016110920 A1 | 7/2016 |

*Primary Examiner* — Michael R. Fin
(74) *Attorney, Agent, or Firm* — HAUPTMAN HAM, LLP (57) ABSTRACT

A management apparatus (50) configured to manage one storage battery apparatus or a plurality of storage battery apparatuses ($30_1$ to $30_c$) includes: a manager (51) configured to manage a dischargeable amount of electrical power having an environmental added value stored in the storage battery apparatuses ($30_1$ to $30_c$); a determiner (54) configured to determine which of the dischargeable electrical power in the storage battery apparatuses ($30_1$ to $30_c$), the electrical power having the environmental added value or electrical power not having the environmental added value, is to be discharged for each electrical-power consuming facility ($20_1$ to $20_b$); and a transmitter (52) configured to transmit, to the storage battery apparatuses ($30_1$ to $30_c$), a message giving an instruction to discharge the determined electrical power to the electrical-power consuming facility ($20_1$ to $20_b$).

6 Claims, 6 Drawing Sheets

(58) Field of Classification Search
USPC .................................................. 307/10.1, 72
See application file for complete search history.

(56) References Cited

U.S. PATENT DOCUMENTS

| | | |
|---|---|---|
| 10,994,625 B2 * | 5/2021 | Okumura ................. B60L 53/51 |
| 11,677,241 B2 * | 6/2023 | Ogawa ..................... H02J 3/38 |
| | | 700/291 |
| 2012/0228933 A1 | 9/2012 | Shiokawa |
| 2013/0073105 A1 * | 3/2013 | Schmid .................... H02J 3/46 |
| | | 709/204 |
| 2014/0049216 A1 | 2/2014 | Nakagawa et al. |

* cited by examiner

| STORAGE BATTERY APPARATUS ID | DISCHARGEABLE AMOUNT (WITH ENVIRONMENTAL ADDED VALUE) | DISCHARGEABLE AMOUNT (WITHOUT ENVIRONMENTAL ADDED VALUE) | CHARGEABLE AMOUNT |
|---|---|---|---|
| | | | |

MANAGEMENT APPARATUS, ELECTRICAL POWER SYSTEM, AND METHOD OF SUPPLYING ELECTRICAL POWER

RELATED APPLICATIONS

The present application is a continuation based on PCT Application No. PCT/JP2020/011859, filed on Mar. 17, 2020, which claims the benefit of Japanese Patent Application No. 2019-057359, filed on Mar. 25, 2019. The content of which is incorporated by reference herein in their entirety.

TECHNICAL FIELD

The present disclosure relates to a management apparatus, an electrical power system, and a method of supplying electrical power.

BACKGROUND ART

In recent years, attention has been focused on a scheme that adds an environmental added value to output electrical power or the like generated using natural energy such as sunlight, wind, and/or geothermal heat. For example, the environmental added value includes a "renewable energy certificate" certified by a third party organization (see, for example, Patent Document 1).

CITATION LIST

Patent Document

Patent Document 1: WO 2016/110920

SUMMARY

A first feature of an embodiment according to the present disclosure provides a management apparatus configured to manage one storage battery apparatus or a plurality of storage battery apparatuses. The management apparatus includes a manager, a determiner, and a transmitter. The manager divides dischargeable electrical power stored in the one storage battery apparatus or the plurality of storage battery apparatuses into electrical power having an environmental added value and electrical power not having the environmental added value, to manage the electrical power. The determiner determines which of the divided dischargeable electrical power, the electrical power having the environmental added value or the electrical power not having the environmental added value, is to be discharged for each electrical-power consuming facility. The transmitter transmits, to the one storage battery apparatus or the plurality of storage battery apparatuses, a message giving an instruction to discharge the determined electrical power to the electrical-power consuming facility.

A second feature of the embodiment according to the present disclosure provides an electrical power system. The electrical power system includes one storage battery apparatus or a plurality of storage battery apparatuses and the management apparatus according to the first feature described above.

A third feature of the embodiment according to the present disclosure provides a method of supplying electrical power, in which a management apparatus configured to manage one storage battery apparatus or a plurality of storage battery apparatuses divides dischargeable electrical power stored in the one storage battery apparatus or the plurality of storage battery apparatuses into electrical power having an environmental added value and electrical power not having the environmental added value, to manage the electrical power. In addition, the management apparatus determines which of the divided dischargeable electrical power, the electrical power having the environmental added value or the electrical power not having the environmental added value, is to be discharged for each electrical-power consuming facility. Furthermore, the management apparatus transmits, to the one storage battery apparatus or the plurality of storage battery apparatuses, a message giving an instruction to discharge the determined electrical power to the electrical-power consuming facility, and as per the message, the one storage battery apparatus or the plurality of storage battery apparatuses discharge the determined electrical power to the electrical-power consuming facility.

DESCRIPTION OF EMBODIMENTS

Existing schemes do not account for a case where electrical power having an environmental added value and electrical power not having the environmental added value are mixed and are stored in the same storage battery apparatus. Thus, in such a case, the existing schemes are not able to discharge only the electrical power having the environmental added value to an electrical-power consuming facility that wishes to use only the electrical power having the environmental added value, which is a problem.

Thus, the present disclosure has been made in view of the problem described above, and an object of the present disclosure is to select electrical power having an environmental added value or electrical power not having the environmental added value to discharge it to an electrical-power consuming facility.

A control system according to an embodiment of the present invention will be described below with reference to the drawings. Note that in the drawings used for the following description, the same or similar components are denoted with the same or similar reference numerals.

First Embodiment

Figure 1:
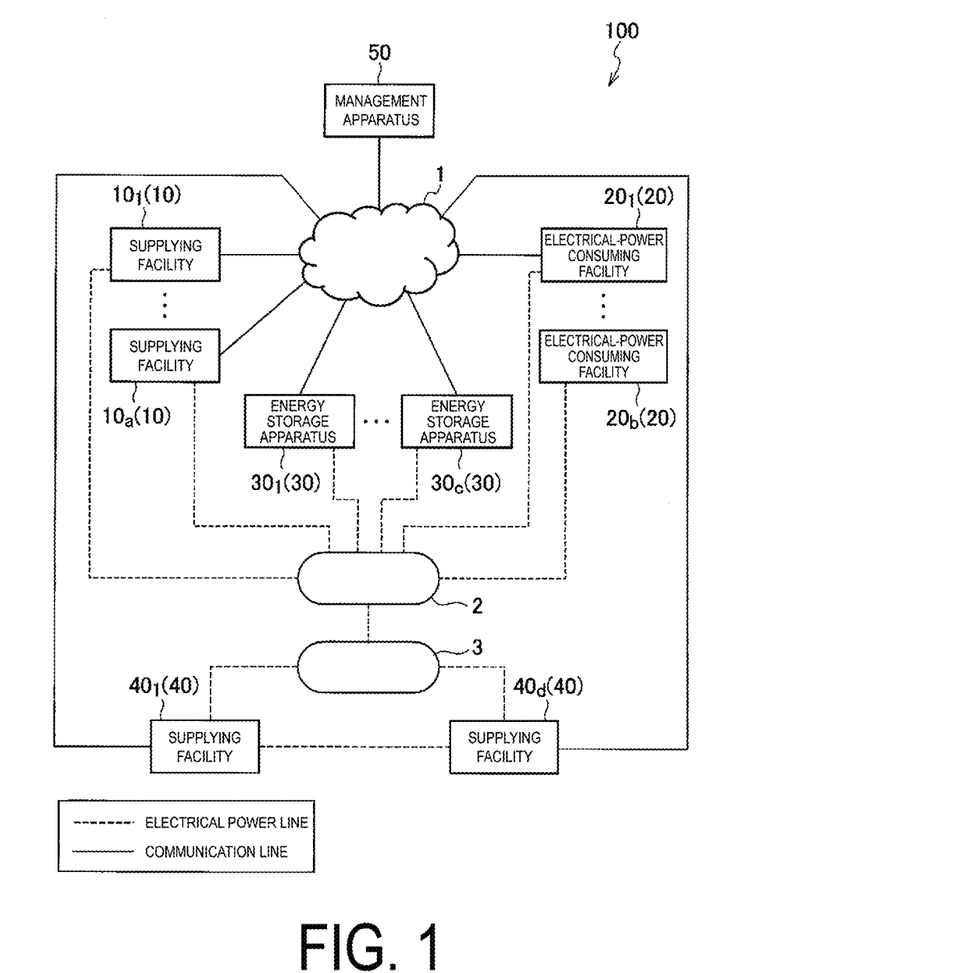
FIG. 1 is a diagram illustrating an example of an overall configuration of an electrical power system 100 according to an embodiment.

Below, a first embodiment according to the present disclosure will be described with reference to FIGS. 1 to 5. FIG. 1 is a diagram illustrating an example of a configuration of an electrical power system 100 according to the present embodiment.

As illustrated in FIG. 1, the electrical power system 100 includes supplying facilities $10_1$ to $10_a$, electrical-power consuming facilities $20_1$ to $20_b$, storage battery apparatuses $30_1$ to $30_c$, and a management apparatus 50. In addition, the electrical power system 100 includes a network 1, a predetermined electrical power grid 2, and a bulk electrical power grid 3.

The supplying facilities $10_1$ to $10_a$ are connected to the predetermined electrical power grid 2. The supplying facilities $10_1$ to $10_a$ output electrical power having an environmental added value to the predetermined electrical power grid 2. For example, the supplying facilities $10_1$ to $10_a$ include a distributed power supply such as a solar cell apparatus, a fuel cell apparatus, a storage battery apparatus, a biomass power generation apparatus, and/or a wind power generation apparatus.

The supplying facilities $40_1$ to $40_d$ are connected to the bulk electrical power grid 3. The supplying facilities $40_1$ to $40_d$ output electrical power having an environmental added value or electrical power not having the environmental added value to the bulk electrical power grid 3. For example, the supplying facilities $40_1$ to $40_d$ may be a thermal power plant, a solar cell facility (mega solar system) including a plurality of solar cells, and/or a wind power generation plant.

The electrical-power consuming facilities $20_1$ to $20_b$ are connected to the predetermined electrical power grid 2. The electrical-power consuming facilities $20_1$ to $20_b$ consume the electrical power supplied from the predetermined electrical power grid 2. Here, it is assumed that the electrical-power consuming facilities $20_1$ to $20_b$ consume at least part of the output electrical power outputted from the supplying facilities $10_1$ to $10_a$. Although there are no specific limitations, the electrical-power consuming facilities $20_1$ to $20_b$ may be small facilities such as residential houses and stores, and/or large facilities such as buildings, shopping malls, athletic fields, power feeding systems for railroads, electricity charging stations for electric vehicles, and train stations.

The storage battery apparatuses $30_1$ to $30_c$ store electrical power supplied by the supplying facilities $10_1$ to $10_a$ and/or the supplying facilities $40_1$ to $40_d$. For example, the storage battery apparatuses $30_1$ to $30_c$ may be provided within a predetermined facility.

The predetermined electrical power grid 2 and the bulk electrical power grid 3 are electrical power grids used for delivering electrical power. The predetermined electrical power grid 2 may be referred to as a microgrid. The predetermined electrical power grid 2 may cover an area narrower than the bulk electrical power grid 3 covers or may cover an area wider than the bulk electrical power grid 3 covers. The predetermined electrical power grid 2 is an electrical power grid with a voltage lower than that of the bulk electrical power grid 3, and may be an electrical power grid having a transmission loss smaller than that of the bulk electrical power grid 3. The predetermined electrical power grid 2 may be an electrical power grid provided or managed by one entity.

Although FIG. 1 illustrates, as an example, a case where the predetermined electrical power grid 2 and the bulk electrical power grid 3 are provided, the present embodiment can be applied to a case where the bulk electrical power grid 3 is not provided and the predetermined electrical power grid 2 alone is provided. In such a case, the supplying facilities $40_1$ to $40_d$ may be connected to the predetermined electrical power grid 2.

The network 1 is a communication network that connects the supplying facilities $10_1$ to $10_a$, the electrical-power consuming facilities $20_1$ to $20_b$, the storage battery apparatuses $30_1$ to $30_c$, the supplying facilities $40_1$ to $40_d$, and the management apparatus 50. For example, the network 1 may include the Internet, a dedicated line such as a virtual private network (VPN), and/or a mobile phone network.

The management apparatus 50 manages one or more of the storage battery apparatuses $30_1$ to $30_c$. Note that the management apparatus 50 may manage the storage battery apparatuses $30_1$ to $30_c$ provided in a private communication network.

Figure 2:
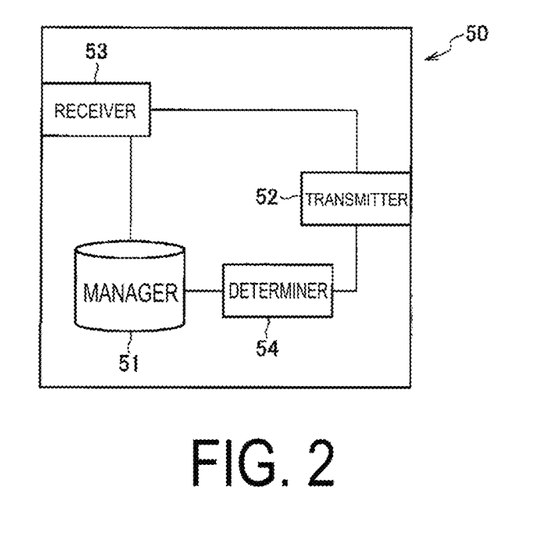
FIG. 2 is a diagram illustrating an example of a functional diagram of a management apparatus 50 according to the embodiment.

Below, the management apparatus 50 according to the present embodiment will be described with reference to FIG. 2. As illustrated in FIG. 2, the management apparatus 50 includes a manager 51, a transmitter 52, a receiver 53, and a determiner 54.

The manager 51 is composed of a storage medium including a memory such as a non-volatile memory and/or a hard disk drive (HDD), and holds various types of information. In addition, the manager 51 may be any other storage apparatus; for example, the manager 51 may be an optical memory apparatus such as an optical disc or may be a magneto-optical disc or the like.

In the present embodiment, the manager 51 manages the dischargeable amount of electrical power having an environmental added value stored in the storage battery apparatuses $30_1$ to $30_c$ managed by the management apparatus 50.

Figure 3:
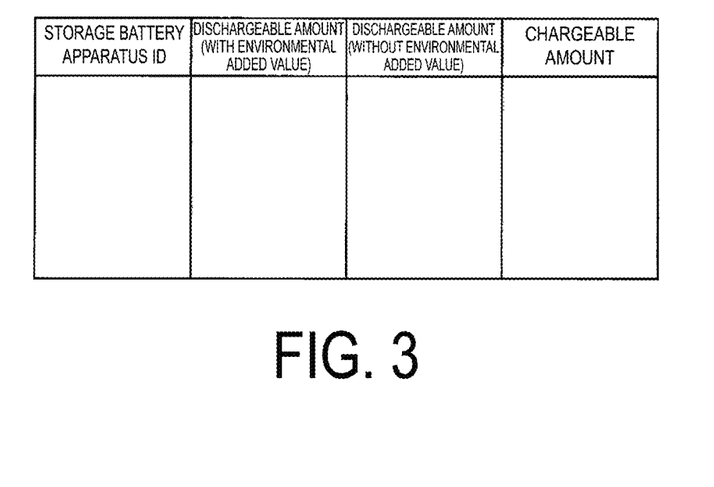
FIG. 3 is a diagram illustrating an example of information managed by a manager 51 of the management apparatus 50 according to the embodiment.

For example, as illustrated in FIG. 3, the manager 51 associates "storage battery apparatus ID", "dischargeable amount (with an environmental added value)", "dischargeable amount (without an environmental added value)", and "chargeable amount" with each other to manage them.

Here, the "storage battery apparatus ID" is information used to individually identify the storage battery apparatuses $30_1$ to $30_c$ managed by the management apparatus 50. The "dischargeable amount (with an environmental added value)" represents the dischargeable amount of electrical power having an environmental added value currently stored in each of the storage battery apparatuses $30_1$ to $30_c$. The "dischargeable amount (without an environmental added value)" represents the dischargeable amount of electrical power not having an environmental added value currently stored in each of the storage battery apparatuses $30_1$ to $30_c$. The "chargeable amount" represents the amount of electrical power that can be currently charged in each of the storage battery apparatuses $30_1$ to $30_c$.

The manager 51 manages the amount of electrical power (that is, the amount of electrical power generated as renewable energy) generated by an apparatus such as a solar cell apparatus, a biomass power generation apparatus, and/or wind power generation apparatus, as a dischargeable amount of electrical power having an environmental added value. On the other hand, as for the amount of other electrical power, the manager 51 may manage it as a dischargeable amount of electrical power not having an environmental added value.

For example, the manager 51 manages the amount of electrical power generated by the supplying facilities $10_1$ to $10_a$ as a dischargeable amount of electrical power having an environmental added value. On the other hand, as for the amount of electrical power generated by the supplying facilities $40_1$ to $40_d$, the manager 51 may manage it as a dischargeable amount of electrical power not having an environmental added value.

The manager 51 may update information indicated in FIG. 3 on a regular basis, or may update information indicated in FIG. 3 in response to a predetermined trigger such as when electrical discharge or electrical charge is performed in each of the storage battery apparatuses $30_1$ to $30_c$.

The determiner 54 may include at least one processor. According to various embodiments, at least one processor may be realized as a single integrated circuit (IC) or realized as a plurality of communicatively connected integrated circuits ICs and/or discrete circuits.

The determiner 54 determines which of the electrical power that the storage battery apparatuses $30_1$ to $30_c$ can discharge, the electrical power having the environmental added value or the electrical power not having the environmental added value, is to be discharged for each of the electrical-power consuming facilities $20_1$ to $20_b$.

For example, the determiner 54 may determine that the electrical power having the environmental added value is to be discharged to the electrical-power consuming facilities $20_1$ to $20_b$ that do not use electrical power not having an environmental added value.

With this configuration, it is possible to discharge only electrical power having an environmental added value to an electrical-power consuming facility that wishes to use only electrical power having an environmental added value.

In addition, the determiner 54 may determine whether the electrical power having the environmental added value is to be discharged or the electrical power not having the environmental added value is to be discharged, for example, on the basis of the "dischargeable amount (with an environmental added value)," the "dischargeable amount (without an environmental added value)," which are managed by the manager 51, and/or a request from the electrical-power consuming facilities $20_1$ to $20_b$.

The transmitter 52 and the receiver 53 include a communication module. Such a communication module may be a wireless communication module compliant with standards such as IEEE802.11a/b/g/n, ZigBee, and/or Wi-SUN, or may be a wired communication module compliant with standards such as IEEE802.3.

The transmitter 52 transmits, to the storage battery apparatuses $30_1$ to $30_c$, a message giving an instruction to discharge the electrical power (the electrical power having the environmental added value or the electrical power not having the environmental added value) determined by the determiner 54, to an electrical-power consuming facility that needs a predetermined amount of electrical power.

In addition, the transmitter 52 transmits, to the supplying facilities $10_1$ to $10_a$, a message giving an instruction to supply the storage battery apparatuses $30_1$ to $30_c$ with a certain amount of electrical power.

Note that, in a case where the electrical power supplied from the supplying facilities $10_1$ to $10_a$ is not sufficient for the storage battery apparatuses $30_1$ to $30_c$, the transmitter 52 transmits, to the supplying facilities $40_1$ to $40_d$, a message giving an instruction to supply the storage battery apparatuses $30_1$ to $30_c$ with an amount of electrical power that corresponds to this insufficient amount.

The receiver 53 receives, from the storage battery apparatuses $30_1$ to $30_c$, the "storage battery apparatus ID," the "amount of dischargeable electricity (with an environmental added value)," the "amount of dischargeable electricity (without an environmental added value)," and the "amount of chargeable electricity" described above. Here, the receiver 53 may receive such information on a regular basis or in response to a predetermined trigger such as when electrical discharge and/or electrical charge is performed in each of the storage battery apparatuses $30_1$ to $30_c$.

Here, the manager 51 may update information indicated in FIG. 3 in accordance with the information received by the receiver 53.

Figure 4:
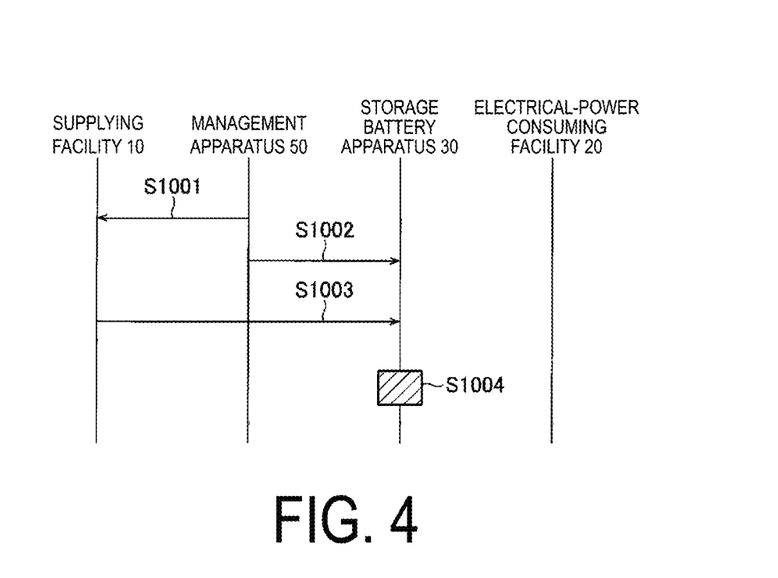
FIG. 4 is a diagram illustrating an example of an operation in a method of supplying electrical power according to the embodiment.
Figure 5:
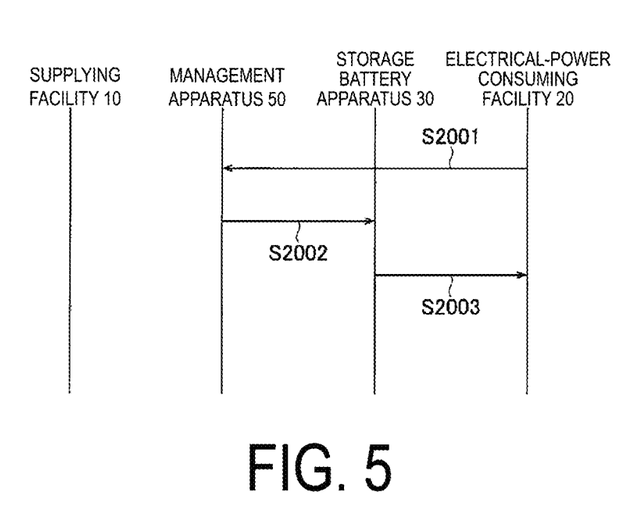
FIG. 5 is a diagram illustrating an example of an operation in the method of supplying electrical power according to the embodiment.

Below, an example of an operation of the electrical power system 100 according to the present embodiment will be described with reference to FIGS. 4 and 5. FIG. 4 illustrates an operation of charging in the storage battery apparatus 30 of the electrical power system 100 according to the present embodiment. FIG. 5 illustrates an operation of discharging from the storage battery apparatus 30 of the electrical power system 100 according to the present embodiment.

First, in step S1001, the management apparatus 50 transmits, to the supplying facility 10, a message giving an instruction to supply the storage battery apparatus 30 with a predetermined amount of electrical power, as illustrated in FIG. 4. In step S1002, the management apparatus 50 notifies the storage battery apparatus 30 that a first electrical power amount is to be supplied from the supplying facility 10.

In step S1003, the supplying facility 10 supplies the storage battery apparatus 30 with the first electrical power amount. In step S1004, the storage battery apparatus 30 stores this first electrical power amount.

Here, in a case where this first electrical power amount is an amount of electrical power generated as renewable energy, the management apparatus 50 manages this first electrical power amount as a dischargeable amount of electrical power having an environmental added value.

On the other hand, in a case where this first electrical power amount is not an amount of electrical power generated as renewable energy, the management apparatus 50 manages this first electrical power amount as a dischargeable amount of electrical power not having an environmental added value.

Secondly, in step S2001, the electrical-power consuming facility 20 transmits, to the management apparatus 50, a message that makes a request to supply a second electrical power amount, as illustrated in FIG. 5.

In step S2002, the management apparatus 50 transmits, to the storage battery apparatus 30, a message giving an instruction to discharge, to the electrical-power consuming facility 20, electrical power having the environmental added value or electrical power not having the environmental added value as the electrical power with the second electrical power amount.

Here, the management apparatus 50 determines whether electrical power having the environmental added value is discharged or electrical power not having the environmental added value is discharged, for example, on the basis of a request from the electrical-power consuming facility 20, whether or not the electrical-power consuming facility 20 uses only renewable energy, and/or the dischargeable amount of power in the storage battery apparatus 30.

In step S2003, in response to the message from the management apparatus 50, the storage battery apparatus 30 discharges the second electrical power amount to the electrical-power consuming facility 20.

With the present embodiment, the storage battery apparatus 30 can select electrical power having the environmental added value or electrical power not having the environmental added value to discharge it to the electrical-power consuming facility 20.

Second Embodiment

Below, with reference to FIG. 6, a second embodiment according to the present disclosure will be described with focus being placed on points different from the first embodiment described above.

Figure 6:
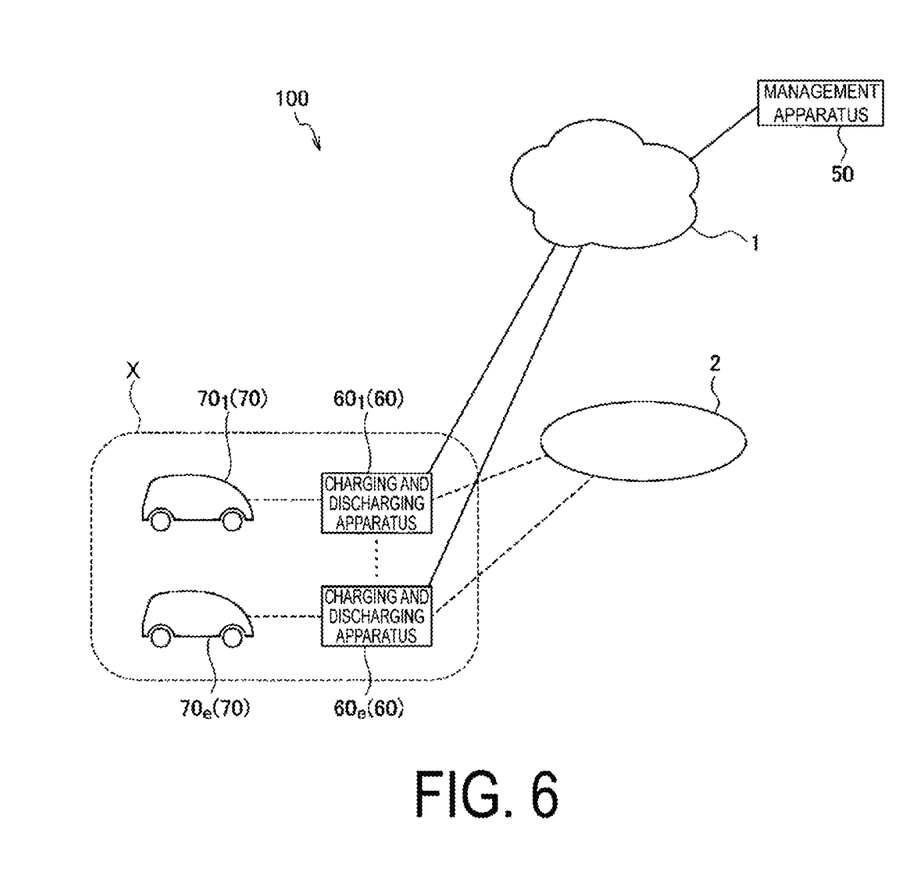
FIG. 6 is a diagram used to explain an electrical power system according to the embodiment.

In addition to the configuration of the electrical power system 100 according to the first embodiment described above, an electrical power system 100 according to the present embodiment includes charging and discharging apparatuses $60_1$ to $60_e$ and vehicles $70_1$ to $70_e$, as illustrated in FIG. 6.

The vehicles $70_1$ to $70_e$ each include a storage battery apparatus mounted thereon, and are configured to be respectively connected to the charging and discharging apparatuses $60_1$ to $60_e$. For example, the vehicles $70_1$ to $70_e$ are electric vehicles.

The charging and discharging apparatuses $60_1$ to $60_e$ are configured to respectively control charging to and discharging from the storage battery apparatuses mounted on the vehicles $70_1$ to $70_e$ to which corresponding ones of the charging and discharging apparatuses $60_1$ to $60_e$ are connected.

In addition, the charging and discharging apparatuses $60_1$ to $60_e$ are configured to respectively manage the dischargeable amount of electrical power having the environmental added value stored in the storage battery apparatuses mounted on the vehicles $70_1$ to $70_e$ to which corresponding ones of the charging and discharging apparatuses $60_1$ to $60_e$ are connected, the dischargeable amount of electrical power not having the environmental added value, and/or the chargeable amount of electrical power.

Here, the charging and discharging apparatuses $60_1$ to $60_e$ may be configured so as not to respectively manage information for identifying the vehicles $70_1$ to $70_e$ to which corresponding ones of the charging and discharging apparatuses $60_1$ to $60_e$ are connected. That is, the charging and discharging apparatuses $60_1$ to $60_e$ may be configured so as not to detect any change of the vehicles $70_1$ to $70_e$ to which corresponding ones of the charging and discharging apparatuses $60_1$ to $60_e$ are connected.

In addition, the charging and discharging apparatuses $60_1$ to $60_e$ may be configured such that the amount of electrical power charged outside of a predetermined area X (for example, a private communication network) and stored in storage battery apparatuses $30_1$ to $30_c$ mounted on vehicles is managed as a dischargeable amount of electrical power not having the environmental added value.

The invention claimed is:

1. A management apparatus configured to manage one storage battery apparatus or a plurality of storage battery apparatuses, the management apparatus comprising:
    a manager configured to divide dischargeable electrical power stored in the one storage battery apparatus or the plurality of storage battery apparatuses into electrical power having an environmental added value and electrical power not having the environmental added value, to manage the electrical power;
    a determiner configured to determine, for each electrical-power consuming facility, out of the dischargeable electrical power, which of the electrical power having the environmental added value and the electrical power not having the environmental added value, is to be discharged to a corresponding electrical-power consuming facility; and
    a transmitter configured to transmit, to the one storage battery apparatus or the plurality of storage battery apparatuses, a message giving an instruction to discharge the determined electrical power to the electrical-power consuming facility.

2. The management apparatus according to claim 1, wherein
    the determiner is configured to determine that the electrical power having the environmental added value is discharged to an electrical-power consuming facility that does not use electrical power not having the environmental added value.

3. An electrical power system, comprising:
    one storage battery apparatus or a plurality of storage battery apparatuses; and
    the management apparatus according to claim 1.

4. The electrical power system according to claim 3, further comprising:
    a charging and discharging apparatus to which a vehicle is connected,
    wherein
    the charging and discharging apparatus is configured to divide dischargeable electrical power stored in a storage battery apparatus mounted on the vehicle, into electrical power having an environmental added value and electrical power not having the environmental added value, to manage the electrical power.

5. The electrical power system according to claim 4, wherein
    the charging and discharging apparatus is configured such that electrical power charged outside of a predetermined area and stored in the storage battery apparatus mounted on the vehicle is managed as the electrical power not having the environmental added value.

6. A method of supplying electrical power, comprising:
    dividing, by a management apparatus, dischargeable electrical power stored in one storage battery apparatus or a plurality of storage battery apparatuses into electrical power having an environmental added value and electrical power not having the environmental added value, to manage the electrical power, the management apparatus being configured to manage the one storage battery apparatus or the plurality of storage battery apparatuses;
    determining, by the management apparatus, for each electrical-power consuming facility, out of the dischargeable electrical power, which of the electrical power having the environmental added value and the electrical power not having the environmental added value, is to be discharged to a corresponding electrical-power consuming facility;
    transmitting, by the management apparatus, a message to the one storage battery apparatus or the plurality of storage battery apparatuses, the message giving an instruction to discharge the determined electrical power to the electrical-power consuming facility; and
    discharging, by the one storage battery apparatus or the plurality of storage battery apparatuses, the determined electrical power to the electrical-power consuming facility as per the message.

* * * * *